Figure 1:
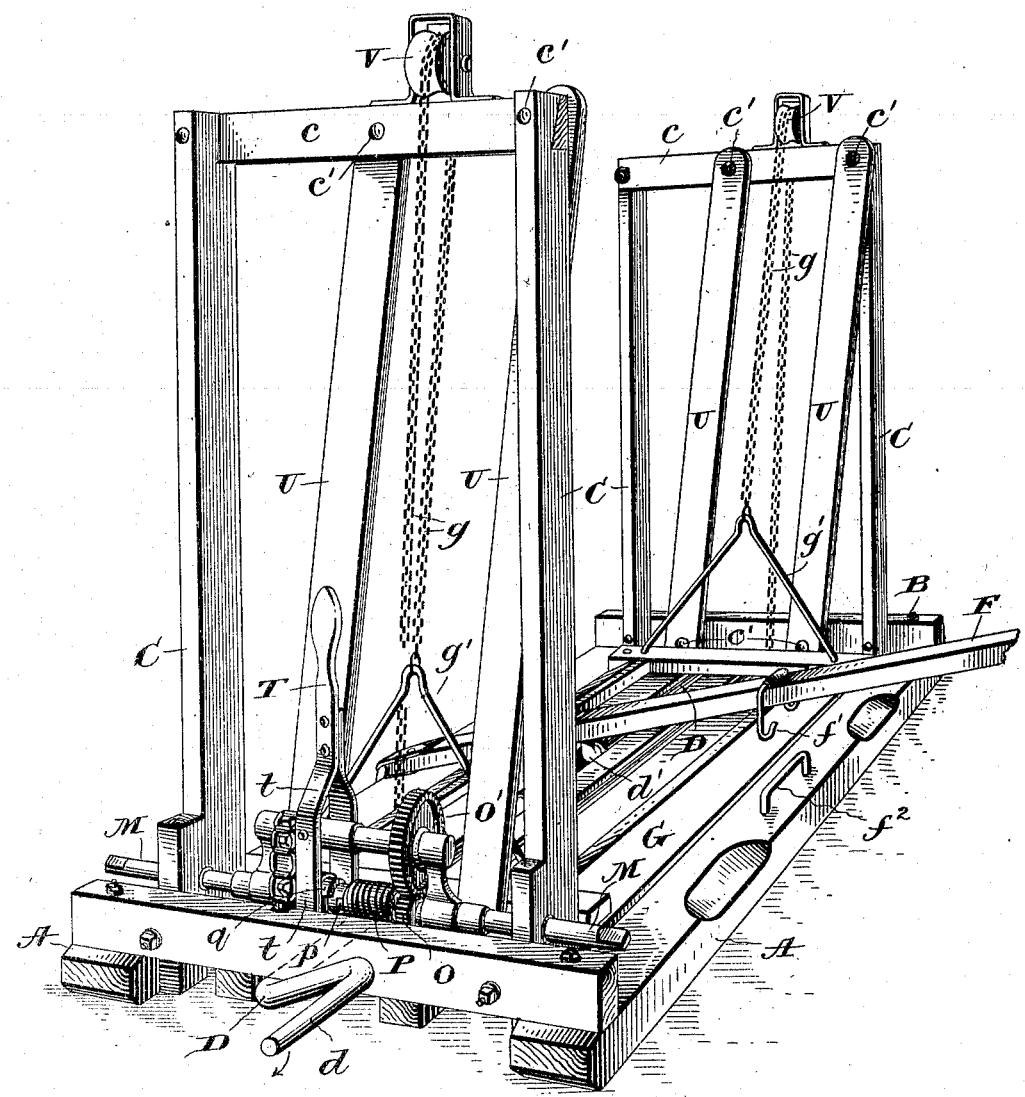

No. 821,686. PATENTED MAY 29, 1906.
J. F. WHITE.
PORTABLE WAGON DUMP.
APPLICATION FILED DEC. 29, 1904.

4 SHEETS—SHEET 1.

Witnesses:
Jas. E. Hutchinson
Thos. R. Heath

Inventor:
John F. White,
By Macon Milans Attorneys

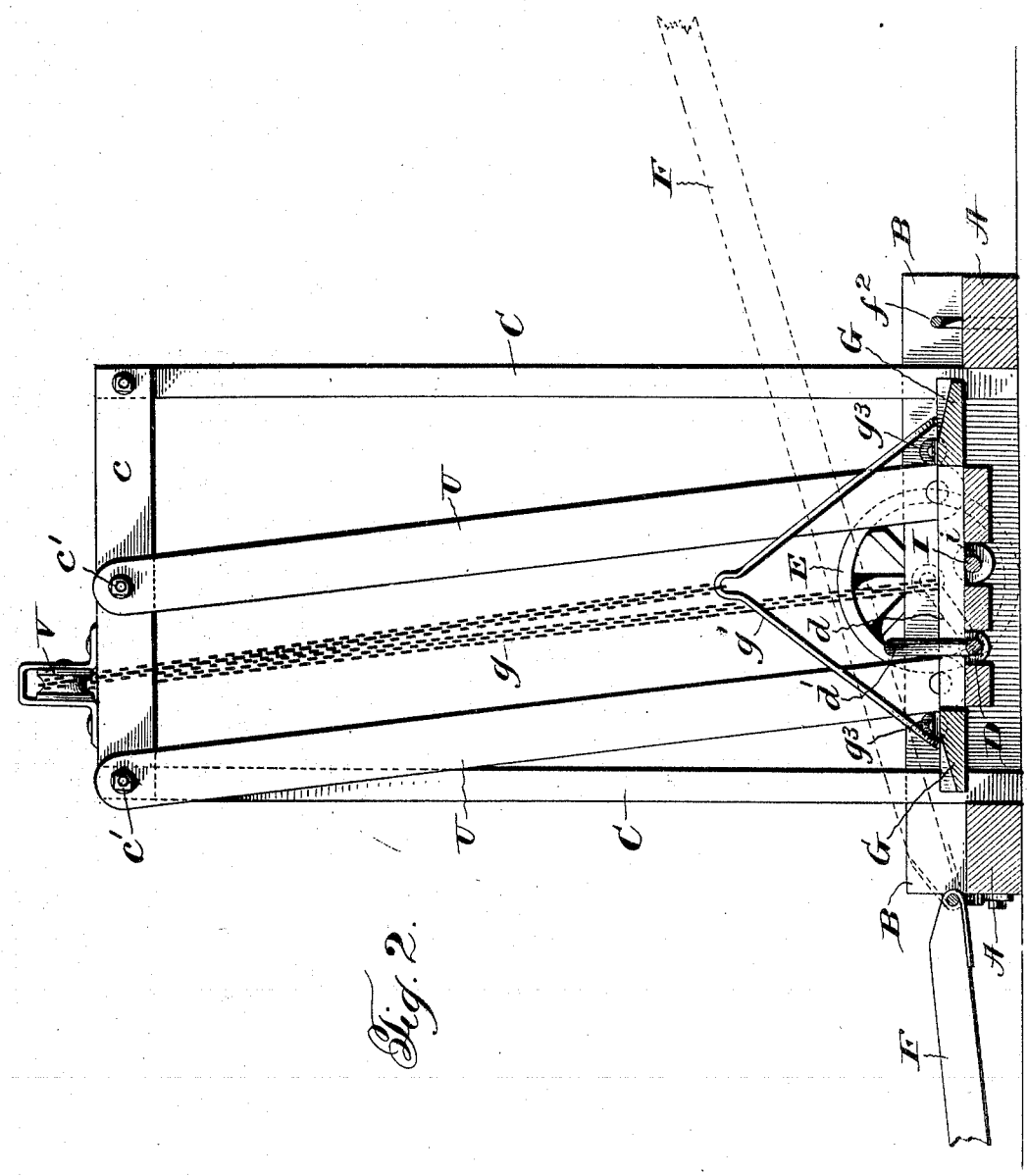

No. 821,686. PATENTED MAY 29, 1906.
J. F. WHITE.
PORTABLE WAGON DUMP.
APPLICATION FILED DEC. 29, 1904.
4 SHEETS—SHEET 3.
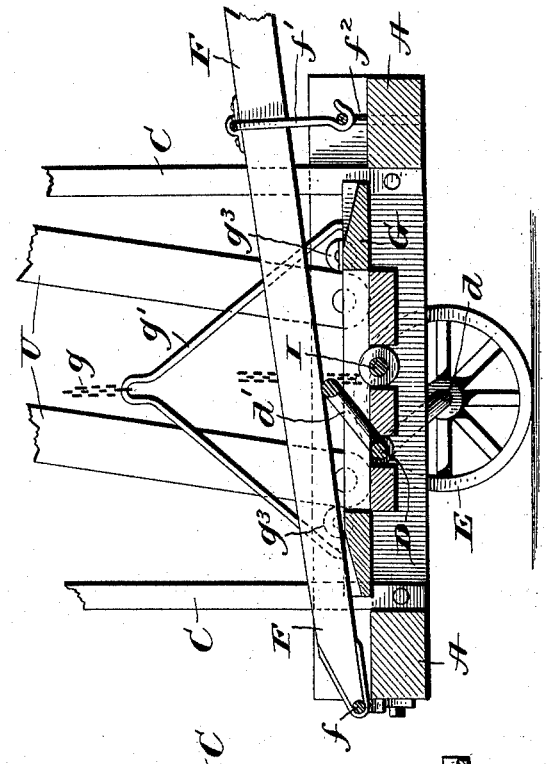
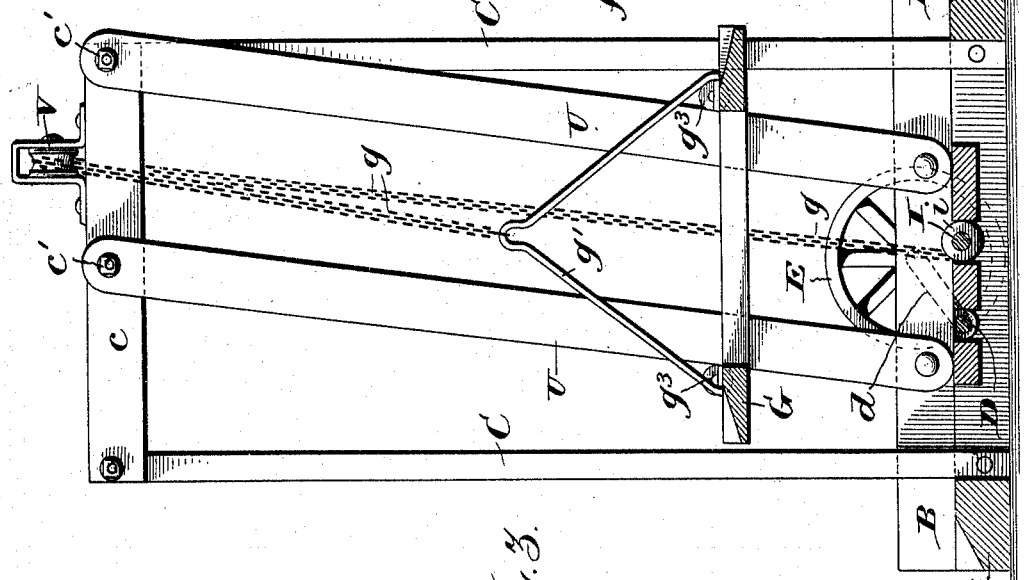

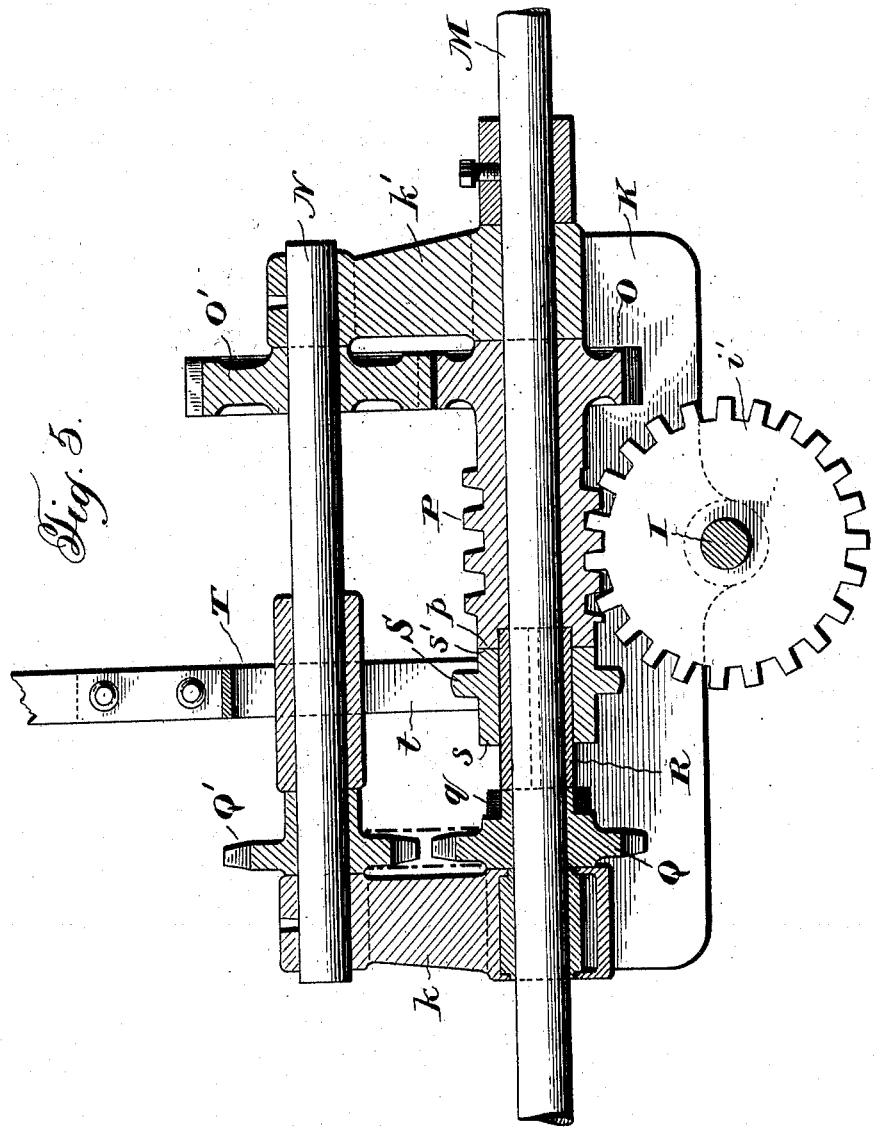

UNITED STATES PATENT OFFICE.

JOHN F. WHITE, OF BLOOMINGTON, ILLINOIS, ASSIGNOR TO PORTABLE WAGON DUMP AND ELEVATOR COMPANY, A CORPORATION OF ILLINOIS.

PORTABLE WAGON-DUMP.

No. 821,686.     Specification of Letters Patent.     Patented May 29, 1906.

Application filed December 29, 1904. Serial No. 238,776.

*To all whom it may concern:*

Be it known that I, JOHN F. WHITE, a citizen of the United States, residing at Bloomington, in the county of McLean and State of Illinois, have invented certain new and useful Improvements in Portable Wagon-Dumps, of which the following is a specification, reference being had therein to the accompanying drawings.

This invention relates to an improvement in portable wagon-dumps, and more particularly to that class of wagon-dumps in which an elevator is employed to raise the forward end of the wagon, so as to discharge the load therein into a drag, from which it is conveyed to any suitable form of conveyer or apparatus. In this form of apparatus as heretofore constructed great difficulty has been experienced on account of the fact that when the elevator, upon which the front wheels of the wagon were supported, was raised the wagon was given a slight forward movement, which caused the rear end thereof to contact with the chute leading to the drag, thereby limiting the upward movement of the wagon; and one of the objects of this invention is to overcome this difficulty and to construct a dump with which a wagon can be dumped from either side of the dump and with which the forward end of the wagon can be elevated to a dumping position without causing any longitudinal travel of the wagon.

A further object of the invention is the provision of a simple form of gearing by which the elevator can be made to travel at different rates of speed when raising and lowering the wagon.

A further object of the invention is the provision of a device of this character which is provided with a base, carrying-wheels movably secured thereto, and means for moving the carrying-wheels relatively to the base, whereby the device may be transported from place to place on the carrying-wheels or can be held stationary, with the base thereof contacting with the ground.

A further object is the provision of a device of this character provided with a base, a tongue secured to said base, carrying-wheels movably secured to said base, and means whereby when the tongue is in a normal position the carrying-wheels will be lowered to raise the base from off the ground.

Referring now more particularly to the drawings, Figure 1 is a perspective view of my improved wagon-dump with one of the carrying-wheels removed therefrom. Fig. 2 is a longitudinal section of the dump with the elevator guide and pulleys in the positions in which they are placed when it is desired to dump a wagon to the left of the dump. Fig. 3 is a similar view showing the guides and pulleys in the positions in which they are placed when it is desired to dump a wagon to the right of a dump. Fig. 4 is a detail view showing the tongue and carrying-wheels secured to the base and the means employed for holding the carrying-wheels in their lowered position when the tongue is in its normal position, and Fig. 5 is a longitudinal section of the gearing used to raise and lower the elevator.

Like reference-letters refer to corresponding parts in the several views.

The dump consists of a framework comprising a substantially rectangular base formed of the end sills A A and the transverse beams B B connecting them and four uprights C extending upwardly form the corners of the base, the upper ends of the uprights at the adjacent end of the sills A A being connected by cross-bars c. The outer edges of the end sills A A are inclined to permit of the front wheels of a wagon being readily drawn onto the elevator G, which is adapted to be raised and lowered in the framework of the dump from either side of the dump.

D designates an axle journaled to the under side of the transverse beams B B intermediate the end sills A A and extending completely across the framework of the machine. The outer ends of the axle D project beyond the transverse beams B B and are bent to form cranks $d$, on which are mounted carrying-wheels E E. The axle D is provided intermediate its ends with a laterally-projecting arm $d'$, which is preferably formed by bending the axle upon itself, but which may, if desired, be formed separate from the axle and then attached thereto. The arm $d'$ extends from the axle in a plane substantially at right angles to the plane in which the cranks lie.

F designates a tongue which is pivotally secured at its rear end to a staple $f$, secured in one of the end sills A. The tongue F in its normal position is adapted to overlie the base of the machine and to rest upon the laterally-projecting arm $d'$, secured to the axle D. From this construction it will be apparent that when the tongue is swung on its pivot $f$ to assume its normal position it will contact with the laterally-projecting arm $d'$, secured to the axle D, thereby rocking said axle in its journal and lowering the carrying-wheels E E. It will be apparent that the lowering of the carrying-wheels E E will raise the base of the machine from off the ground, so that it can be transported from place to place. The carrying-wheels are held in their lowered position by means of a hook $f'$, which is secured to the tongue F and which is adapted to engage a staple secured in one of the end sills A. When it is desired to support the machine in a dumping position, the hook $f'$ is released from its engagement with the staple $f^2$ and the tongue F is swung back on its pivot $f$ and permitted to rest upon the ground. As soon as the tongue F is removed from the laterally-projecting arm $d'$ on the axle D the framework of the machine will descend by gravity until the base thereof rests upon the ground.

G designates the elevator-platform, which is adapted to support the front wheels of the wagon and to be raised and lowered in the framework of the dump for moving the wagon to and from a dumping position. The elevator-platform G comprises an open frame formed in the usual manner with parallel side pieces and connecting end pieces. The frame of the elevator-platform must be open, however, to permit the laterally-projecting arm $d'$, secured to the axle D, to project therethrough. The elevator-platform is raised and lowered by means of chains $g$, which are secured at one end to bails $g'$, secured to the ends of the elevator-platform, and which pass over pulleys V, secured to the cross-bars $c$, connecting the uprights C, and have their other ends secured to drums $i$, which are mounted on a transverse shaft I, journaled to the under side of the transverse beams B B. From this construction it will be apparent that the platform will be raised or lowered accordingly as the shaft I is driven in one direction or the other. In this class of devices it is desirable to raise the platform slowly, but to return it to its initial position quickly, and I have provided a simple and efficient form of gearing by means of which this may be accomplished and which I will now proceed to describe.

K designates a casting designed to be secured to one of the transverse beams B between the uprights C. The casting K is provided with a pair of upwardly-extending arms $k\ k'$, in which are journaled a drive-shaft M and a counter-shaft N, located above and parallel to the drive-shaft. Loosely mounted on the drive-shaft M adjacent the arm $k'$ of the casting K is a gear-wheel O, and formed integral with the gear-wheel O is a worm-screw P, adapted to mesh with a gear $i'$ on the drum-shaft I. Loosely mounted on the drive-shaft M, adjacent the arm $k$ of the casting, is a sprocket-wheel Q. A bushing R, which has a keyed engagement with the drive-shaft M, is interposed between the adjacent faces of the sprocket-wheel Q and the worm-screw P to prevent the endwise movement of said sprocket-wheel and worm-screw on the shaft M. The adjacent ends of the sprocket-wheel Q and worm-screw P are provided with clutch-faces $p$ and $q$, which are adapted to be engaged, respectively, by the clutch-faces $s$ and $s'$ of a clutch member S, which is slidable on the bushing R and which has a keyed engagement with the shaft M.

T is a lever which is pivotally mounted to any suitable part of the frame and which has a bifurcated end $t$, which has a swivel connection with the clutch member S and serves to shift the same to cause said clutch member to clutch either the gear-wheel Q or the worm-screw P to the drive-shaft M. Secured to the counter-shaft N is a gear-wheel O', which meshes with the gear-wheel O on the drive-shaft, and a sprocket-wheel Q', which is connected by a chain with the sprocket-wheel Q on the drive-shaft. If the clutch member S is shifted to bring the clutch-face $s'$ thereof into engagement with the clutch-face $p$ on the end of the worm-screw P, said worm-screw P will be caused to rotate with the drive-shaft and the drum-shaft I will be driven slowly to cause the upward movement of the elevator G. When the elevator G has been raised to the desired position, the clutch S is shifted to bring the clutch-face $s$ thereof into engagement with the clutch-face $q$ of the sprocket-wheel Q. Motion will then be imparted to the drive-shaft I through the sprocket-wheels Q and Q' and gear-wheels O' and O and worm-screw P and gear $i'$ to drive said shaft in the opposite direction at a higher rate of speed, owing to relative sizes of the various gears and sprocket-wheels, thereby causing the lowering of the elevator G. While I have shown the lever T as adapted for manual operation, it is obvious that said lever might be automatically operated at predetermined intervals to cause the raising and lowering of the elevator-platform G.

Pivotally secured at their lower ends to the inner side of each of the cross-beams B B intermediate the uprights C are a pair of inclined guide-bars U, the upper ends of which are secured to the cross-bars $c$ by bolts $c'$ passing through apertures therein. The cross-bars $c$ are each preferably formed with three apertures therein, said apertures being equidistant from each other. From this construction it will be apparent that by removing the bolts $c'$ the guide-bars can be readily shifted to incline either to the left, as shown in Fig. 2, or to the right, as shown in Fig. 3, accordingly as it is desired to dump a wagon from the right or left hand side of the dump.

The pulleys V, over which the hoisting-cables pass, are secured to the cross-bars $c$ intermediate the ends of the guide-bars U, and when the guide-bars are shifted the pulleys are also shifted, as will be apparent upon an inspection of Figs. 2 and 3. Guide-rollers $g^3$ are secured to the elevator-platform G and bear against the outer edges of the guide-bars U. From the above-described construction it will be apparent that when the elevator G is raised the front end of the wagon which is supported thereon will, owing to the inclined guide-bars U, travel upwardly along the chord of an arc of a circle, thereby preventing any substantially longitudinal travel of the wagon.

I do not desire to limit myself to the precise form and construction shown in the drawings, as it is obvious that many minor changes might be made thereto without departing from the spirit of the invention herein.

Having thus described the invention, what is claimed as new, and desired to be secured by Letters Patent, is—

1. In a wagon-dump, an elevator adapted to support the forward end of a wagon, means for raising and lowering said elevator, and means for imparting a lateral movement to said elevator to either side of the dump during its upward movement.

2. In a wagon-dump, an elevator, means for raising and lowering said elevator, and means reversible from one side of the dump to the other for imparting a lateral movement to the elevator during its upward movement.

3. In a wagon-dump, an elevator adapted to support the forward end of a wagon, means for raising and lowering said elevator, and means reversible from one side of the dump to the other for causing the elevator to travel substantially in the arc of a circle during its upward movement.

4. In a wagon-dump, an elevator adapted to support the forward end of a wagon, means for raising and lowering said elevator, and adjustable means for imparting a lateral movement to the elevator during its upward movement.

5. In a wagon-dump, a frame, an elevator, means for raising and lowering said elevator in said frame, and adjustable inclined guides secured to said frame and in engagement with said elevator, whereby a lateral movement will be imparted to said elevator during its upward movement.

6. In a wagon-dump, a frame, an elevator, means for raising and lowering said elevator in said frame, and reversible inclined guide-bars secured to said frame and in engagement with said elevator.

7. In a wagon-dump, a frame comprising uprights and cross-bars secured to the upper ends thereof, an elevator in said frame, a drum-shaft, hoisting-cables having one of their ends secured to the drum-shaft and their other ends secured to the elevator, a pair of guide-bars pivotally secured at their lower ends to each side of the frame and having their upper ends adjustably connected to the cross-bars secured to the uprights, and supporting-pulleys for the hoisting-cables secured to said cross-bars intermediate the ends of the guide-bars.

8. In a wagon-dump, a frame comprising a base and a pair of adjustable inclined supporting-bars secured to opposite sides of said base, an elevator adapted to support the forward end of a wagon secured in said frame and in slidable engagement with said supporting-bars, and means for raising and lowering said elevator.

9. In a wagon-dump, a frame comprising a base and pairs of adjustable inclined supporting-bars secured to opposite sides thereof, cross-bars secured to the upper ends of each pair of supporting-bars, an elevator in said frame, and in slidable engagement with said supporting-bars, supporting-pulleys secured to said cross-bars intermediate the ends of the supporting-bars, and hoisting-cables supported on said pulleys and secured to the elevator.

10. In a wagon-dump, a frame, carrying-wheels movably secured to said frame and normally occupying a position permitting the frame to rest upon the ground, a draft-tongue movably secured to said frame, and means whereby when said tongue is moved to an operative position the carrying-wheels will be lowered to raise the frame from off the ground.

11. In a wagon-dump, a frame, carrying-wheels movably secured to said frame and normally occupying a position permitting the frame to rest on the ground, a draft-tongue pivotally secured to said frame, and means whereby when the tongue is moved to an operative position, the carrying-wheels will be lowered to raise the frame from off the ground.

12. In a wagon-dump, a frame, an axle journaled in said frame and provided with projecting cranked portions, carrying-wheels secured to said cranked portions and normally occupying a position permitting the frame to rest on the ground, a draft-tongue pivotally connected to said frame, and means whereby when said tongue is moved to an operative position, the axle will be rocked to lower the carrying-wheels.

13. In a wagon-dump, a frame, an axle journaled in said frame and provided at its ends with cranked portions and intermediate its ends with a laterally-projecting arm, carrying-wheels secured to said cranked portions and normally occupying a position permitting the frame to rest on the ground, and a tongue pivotally connected to said frame and adapted when in an operative position to overlie the projecting arm secured to the axle and hold the carrying-wheels in their lowered position.

14. In a wagon-dump, a frame, an axle journaled in said frame and provided at its ends with cranked portions and intermediate its ends with a laterally-projecting arm, carrying-wheels secured to said cranked portions and normally occupying a position permitting the frame to rest on the ground, a tongue pivotally connected to said frame and adapted when in an operative position to overlie the projecting arm secured to the axle and hold the carrying-wheels in their lowered position, and means for locking the tongue in its operative position.

15. In a wagon-dump, an elevator, a drum-shaft adapted upon rotation to raise and lower said elevator, a gear-wheel secured to said shaft, a drive-shaft, a gear loosely mounted on said drive-shaft and meshing with the gear on said drum-shaft, a sprocket-wheel loosely mounted on the drive-shaft, a counter-shaft, a gear-wheel loosely mounted on the drive-shaft, a sprocket-wheel and gear keyed to said counter-shaft and geared with the sprocket-wheel and gear on the drive-shaft, and a clutch interposed between the sprocket-wheel and gear-wheel on the drive-shaft.

16. In a wagon-dump, an elevator, a drum-shaft adapted upon rotation to raise and lower said elevator, a gear-wheel secured to said shaft, a drive-shaft, a gear loosely mounted on said drive-shaft, a worm-screw secured to said gear and meshing with the gear on the drum-shaft, a sprocket-wheel loosely mounted on the drive-shaft, a counter-shaft, a sprocket-wheel and gear keyed to said counter-shaft and geared with the sprocket-wheel and gear on the drive-shaft, and a clutch for causing either the sprocket-wheel or gear on the drive-shaft to run therewith.

17. In a wagon-dump, a frame, an axle journaled in said frame and provided with crank portions and with a lateral projecting portion, carrying-wheels secured to said crank portions and normally occupying a position permitting the frame to rest on the ground, and a member adapted to overlie the laterally-projecting portion and hold the carrying-wheels in their lowered position 18. In a wagon-dump, a frame, an elevator therein, means for raising and lowering the elevator, adjustable carrying-wheels for said frame, a draft-tongue associated with said frame, and mechanism actuated by said tongue for adjusting the carrying-wheels.

19. In a wagon-dump, an elevator, means for raising and lowering said elevator including a drum-shaft, and a worm-gear for actuating the same, a drive-shaft, a counter-shaft geared thereto, means for imparting a direct movement to said worm-gear from the drive-shaft, and means for imparting an indirect movement and at a different speed to said worm-gear from said counter-shaft.

20. In a wagon-dump, an elevator, means for raising and lowering said elevator including a drum-shaft, a drive-shaft, a counter-shaft, a gear carried by one of said shafts and meshing with the gear on the drum-shaft, a gear connection between said shafts, a sprocket connection between said shafts, and a clutch for connecting either the gear or sprocket connection with the shafts.

21. In a device of the class described, the combination with a base, a platform adapted to be elevated and lowered on the said base, a drive-shaft, a worm-wheel shaft, differential gearing loosely carried on the drive-shaft and continuously in connection with the worm-wheel shaft, clutch devices for controlling the connection of the differential gears with the drive-shaft, and cables in connection with the said worm-wheel shaft and said platform, substantially as specified.

22. In a wagon-dump, a frame, an axle journaled in said frame and provided at its ends with crank portions and intermediate its ends with a laterally-projecting portion, carrying-wheels secured to said crank portions and normally ocupying a position permitting the frame to rest on the ground, a member carried by the frame and movable to a position to overlie the laterally-projecting portion of the axle and hold the carrying-wheels in a lowered position, and means for locking said member in its operative position.

In testimony whereof I affix my signature in presence of two witnesses.

JOHN F. WHITE.

Witnesses:
EVERETT HAMILTON,
IRENE ETHELL.